United States Patent [19]

Ross

[11] E Re. 31,047

[45] Reissued Oct. 5, 1982

[54] HOSE STRUCTURE

[75] Inventor: John A. Ross, Tandragee, Northern Ireland

[73] Assignee: The Goodyear Tire & Rubber Company, Akron, Ohio

[21] Appl. No.: 114,859

[22] Filed: Jan. 24, 1980

Related U.S. Patent Documents

Reissue of:

[64] Patent No.: 4,157,101
Issued: Jun. 5, 1979
Appl. No.: 867,215
Filed: Jan. 5, 1978

U.S. Applications:

[63] Continuation-in-part of Ser. No. 854,572, Nov. 25, 1977, abandoned, which is a continuation of Ser. No. 691,731, Jun. 1, 1976, abandoned.

[30] Foreign Application Priority Data

Jun. 6, 1975 [GB] United Kingdom ..... 24505/75
Jun. 29, 1977 [GB] United Kingdom ..... 27180/77

[51] Int. Cl.[3] ..... F16L 11/00

[52] U.S. Cl. ..... 138/130; 138/103; 138/126; 138/133; 138/138; 138/178; 138/DIG. 9; 428/36; 428/222; 428/250

[58] Field of Search ..... 138/124, 125, 126, 129, 138/130, 144, 153, 133, 138, 141, 103; 428/36, 222, 250

[56] References Cited

U.S. PATENT DOCUMENTS

| | | | |
|---|---|---|---|
| 3,194,274 | 7/1965 | Griffiths et al. | 138/125 |
| 3,212,528 | 10/1965 | Haas | 138/129 |
| 3,729,028 | 4/1973 | Horvath et al. | 138/130 |
| 3,871,408 | 3/1975 | Wood et al. | 138/125 |
| 3,905,398 | 9/1975 | Johansen et al. | 138/124 |

*Primary Examiner*—William R. Dixon, Jr.
*Attorney, Agent, or Firm*—D. M. Ronyak

[57] ABSTRACT

A hose that will withstand pressure and vacuum as well as resist kinking or collapsing in which the wall structure includes at least two radially spaced layers of monofilaments of textile material with a layer of elastomeric material separating the layers. Also at least one additional layer of a fabric of aramid fiber is included in the wall as additional reinforcement. Construction is of relative lightweight and may be readily adapted to a floating hose construction.

17 Claims, 6 Drawing Figures

HOSE STRUCTURE

Matter enclosed in heavy brackets [ ] appears in the original patent but forms no part of this reissue specification; matter printed in italics indicates the additions made by reissue.

This invention is a continuation-in-part of application Ser. No. 854,572 filed Nov. 25, 1977, which is a continuation of application Ser. No. 691,731 filed June 1, 1976, entitled "Hose Structure" both now abandoned.

This invention relates to hoses for suction and discharge purposes, as used for the transport of oil, water, petrol, sand and gravel slurries, dredger spoil and many other liquids and slurries.

These hoses must withstand pressure operations as well as vacuum operations and be resistant to kinking when bent but at the same time form a comparatively small bend radius.

Present constructions are usually from 2 inches (5 cm) to 30 inches (75 cm) internal diameter and are based on a rubber lining or tube, a rubber cover and, between the tube and cover, some form of reinforcement. Such hoses can withstand either pressure or vacuum. The reinforcement against pressure is generally a cotton or synthetic yarn, which may be either woven or in cord form. Alternatively wire cords can be used for this purpose. The reinforcement against vacuum is usually a helix (or helices) or very heavy wire which while resisting vacuum, external pressure, still allows the hose to flex. Thus, conventionally, such hoses are composed of rubber, metal and textile material, and while resistant to pressure and vacuum do not resist crushing.

In one particular application, the hoses are provided with flotation material to enable the hose to float on water even when full of oil or dredging spoil. Thus, the high density of a hose containing a helical wire reinforcement wire is a problem in that it requires a large amount of flotation material.

Hoses reinforced only with polyester high-denier monofilament material, in particular "Macrofil" produced by Imperial Chemical Industries Ltd. have also been proposed; see British Patent Specification No. 1,293,200. Such hoses are relatively lightweight.

The present invention provides an improved relatively lightweight hose which is resistant to pressure and vacuum operation and preferably either resistant to crushing or of good recovery from crushing.

In one aspect of the present invention consists in a hose of reinforced elastomeric material wherein the reinforcement comprises at least one layer of wound monofilament reinforcement and at least one layer of aramid fabric reinforcement.

Preferably the monofilament winding is applied at an angle between 50° and 60° to the axis of the hose. Preferably moreover, there are two such layers, usually associated with an intermediate layer of elastomeric material such as natural or synthetic rubber. One or more such layers may comprise a plurality of windings disposed one about another. The monofilament may be a polyester monofilament such as polyethylene terephthalate, but other polymers, e.g. nylon, can be used.

The fabric reinforcement is again preferably applied at an angle of between 50° and 60° to the hose axis and is a fabric made of an aramid yarn, for example a cord fabric or square-woven fabric. Preferably it is used in conjunction with a suitable rubbery adhesive layer on one side.

It will be apparent therefore that the reinforcement of the hose wall located between the inner lining and outer cover, in a preferred embodiment, consists of a substantial rubber lining with monofilament reinforcement on each surface, to which the fabric reinforcement is adhered by the rubbery material. In such an instance the fabric layer may be outermost or innermost, and the order of the layers will be monofilament-rubber layer—monofilament—adhesive-fabric layer.

It is also, however, envisaged to adhere the fabric by means of the rubbery adhesive layer to one of the monofilament layers so that it is located between the two monofilament layers and adjacent to the substantial rubber layer. In such an instance the order of the layers will be for instance, monofilament—adhesive-fabric—elastomeric material—monofilament. In either instance, of course, these various layers are to be included within the inner lining and outer cover.

In another aspect of the invention the intermediate layer of elastomeric material may be a cellular polymeric foam in various configurations between the monofilament layers and the structure may or may not include a ply of aramid fabric reinforcement. The foam is intended to further increase the buoyancy of the hose while retaining its lightweight advantage and resistance to pressure, vacuum and crushing.

The invention will be further described with reference to the drawings accompanying the specification, in which.

Figure 1:
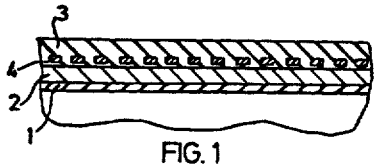
FIG. 1 is a section through part of the wall of a known type of hose.

FIG. 1 shows a hose composed of an innermost rubber lining or tube 1, a pressure resistant reinforcement 2, and a rubber cover 3. The pressure resistant reinforcement 2 may consist of fabric or natural textile materials, or of a fabric made from synthetic textile materials, or of a layer of steel wire cords. A heavy wire helix 4 is wound around the reinforcement 2 and thus embodied in the rubber cover layer 3. Such a hose, while resistant to pressure to crushing and is of relatively high density such that it needs a large amount of flotation material associated with it before it can float on water.

Figure 2:
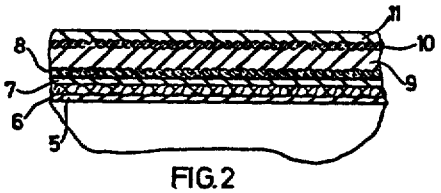
FIGS. 2, 3 and 4 are corresponding sections through part of the wall of various embodiments of hose according to the invention.

FIG. 2 shows a section of a hose wall according to the invention. It consists successively of (a) an innermost lining, or tube 5, made of natural or synthetic rubber (b) a layer 6 of reinforcement fabric made from aramid yarn, the reinforcement being applied with the major axis of the reinforcement at an angle of 55° to the axis of the hose (c) a rubber adhesive layer 7 (d) a first layer of monofilament 8, again wound with its major axis at an angle of 55° to the axis of the hose (e) a substantial layer of elastomeric material 9 which may be cellular foam for increased buoyancy (f) a second layer 10 of the monofilament applied at 55° to the hose axis (usually in the opposite sense to the first) and (g) a rubber cover layer 11. Inner and/or outer breaker fabrics (not shown) may also be incorporated if desired.

Figure 3:
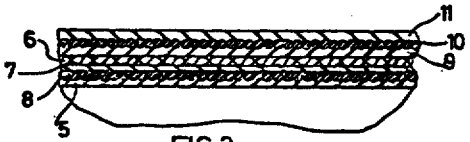

FIG. 3 shows a hose construction in which the composition of the individual layers is as described above in relation to FIG. 2, but in which the order of the layers is different. Thus, the layers are applied in the order 5, 8, 7, 6, 9, 10 and 11.

Figure 4:
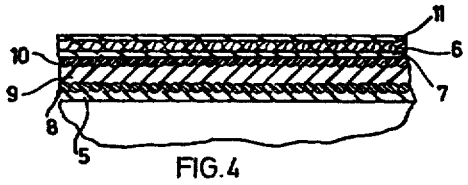

FIG. 4 again shows a section of a hose wall with the same components arranged in a further different order. In this case the components are arranged in the order 5, 8, 9, 10, 7, 6, 11.

Although layer 6 of reinforcement fabric of aramid yarn and layers 8 and 10 of monofilaments for the purposes of illustration are shown as single layers, in most instances each of such layers will be multiple layers, composed of 2, 4, 6 or 8 layers with cord being applied at 55° to the hose axis and each successive layer being applied in the opposite sense to the previous layer.

Although the fabrics will in general be applied at an angle of 55°, for specific purposes e.g. for flexibility and kink resistance angles other than 55° may be used for some or all of the layers of monofilament and/or aramid.

The man skilled in the art will realize that the relative thickness of the layers, and the relative thickness of the hose wall compared to the hose diameter are not necessarily as shown in the drawings but resemble those thicknesses or proportions usual in the art. It is to be noted that the polymeric foam layer 9 will in general have a thickness greater than 5% of the diameter of the hose, and not less than ¼ inch and may vary upwardly depending on whether buoyancy is a requirement and if a cellular foam material is applies as the interlayer.

While the Applicants do not intend to be limited by any theoretical explanation of their invention, it appears that the layer of monofilaments (which are preferably polyester monofilaments) provide resistance to collapse under vacuum and that the layer of aramid fabric reinforcement provides resistance to internal pressure. Moreover, the hose is relatively lightweight in that all of the components are organic in nature without any incorporation of metallic reinforcement. The hose is also more flexible than conventional wire-reinforced hoses and more resistant to crushing, with good recovery after any crushing which does take place.

The layer 6 of aramid fiber fabric can be for example composed of a yarn of a tensile strength of 22 grams per denier and an elongation between 2% and 4% at break. This yarn can be made up as a cord fabric or square woven fabric and for example can be of 1,000 denier or 2,000 denier weight.

The monofilament is preferably based on yarns in the 1,000 to 10,000 denier range composed of individual monofilaments in the range 100 to 1,500 denier and a tenacity of at least 6 grams per denier.

Table 1 gives properties of the monofilament and aramid yarns in comparison with other materials used in hose reinforcement. This deomonstrates the advantageous properties of aramid fibers regarding strength and weight. It does not demonstrate the advantageous stiffness properties of the monofilament since there is no suitable test.

TABLE I

| | Polyester Monofilament | Aramid | Nylon | Polyester | Steel Wire |
|---|---|---|---|---|---|
| Elongation at break % | 13 | 2–4 | 13–16 | 11–17 | 2–4 |
| Tenacity gm/decitex | 6.25 | 21 | 7.2–8.2 | 6.7–7.6 | 3.4–4.0 |
| Specific Gravity | 1.38 | 1.44 | 1.14 | 1.38 | 7.85 |

The preferred structure is that shown in FIG. 2, since this makes the best use of the relative strengths and stiffnesses of the components.

Table 2 compares the properties of hoses made according to the construction shown in FIG. 2. These hoses are specifically for the oil suction and discharge purposes and in particular for use as floating hoses used for this purpose.

TABLE 2

| REINFORCEMENT | SYNTHETIC TEXTILE & STEEL HELIX | STEEL CORD & STEEL WIRE HELIX | MONOFILAMENT | MONOFILAMENT & ARAMID |
|---|---|---|---|---|
| Temporary Elongation at 225 psi pressure % | 10 | 7.5 | 10 | 7.5 |
| Permanent Elongation after release of pressure | 2.5 | 1.5 | 2.5 | 1.5 |
| Minimum Bend Radius (12" Bore Hose) ins. | 152 | 72 | 48 | 48 |
| Recovery after Crushing | NIL | NIL | COMPLETE | COMPLETE |
| Burst Minimum psi | 1125 | 1125 | 1125 | 1125 |
| Specific Gravity of Hose | 1.90 | 2.14 | 1.50 | 1.50 |
| 12" Bore Hose | | | | |
| Wall Thickness ins | 1.67 | 1.50 | 2.15 | 1.75 |
| Vol. of Material in 1 ft. length of hose | | | | |
| cu ins | 867 | 763 | 1146 | 907 |
| cu ft | .502 | .442 | .663 | .525 |
| Wt. of Material in 1 ft. length of hose | | | | |
| lbs. | 59.5 | 59.0 | 62.1 | 49.1 |
| Flotation Material (SG = 0.04) per 1 ft. length of hose (Reserve buoyancy 33%) | | | | |
| wt lbs | 2.75 | 2.80 | 2.40 | 1.85 |
| Vol. cu ft | .984 | .998 | .84 | .663 |

Table 3 gives details of the construction of the hoses to which the third and fourth columns of Table 3 relate, while Tables 4 and 5 give the properties of the monofilament and aramid materials used in these hoses.

TABLE 3

| CONSTRUCTION OF 12" BORE HOSES (inch dimensions) | MONOFILAMENT | MONOFILAMENT & ARAMID |
|---|---|---|
| Tube Thickness | 0.187 | 0.187 |
| Breaker Fabric | 0.055 | 0.055 |
| Mean Diameter or Aramid Reinforcement | — | 12.604 |
| Number of Layers of Aramid Fabric | — | 2 |
| Mean Diameter of first Monofilament Reinforcement | 12.900 | 12.828 |
| Number of Layers of Monofilament Reinforcement | 8 | 2 |
| Sandwich Elastomeric Layer Thickness inches | 1.00 | 1.00 |
| Mean Diameter of second Monofilament Reinforcement | 15.628 | 15.036 |
| Number of Layers of Monofilament Reinforcement | 6 | 2 |
| Breaker Fabric | 0.055 | 0.055 |
| Cover Thickness | 0.124 | 0.124 |
| TOTAL OUTSIDE DIAMETER OF HOSE: | 16.298 | 15.498 |

TABLE 4

| ARAMID YARN & FABRIC | |
|---|---|
| WARP | Aramid Yarn 1500 denier/2 fold/3 cable Twist 5 tpi (doubled) 2.5 tpi (cable) |
| WEFT | 30's/4 ply rayon |
| ENDS PER INCH | 20 |
| PICKS PER INCH | 2 |
| STRENGTH PER WARP END | 315 lbs |

TABLE 5

| MONOFILAMENT YARN & FABRIC | | |
|---|---|---|
| WARP | (7 monofilaments) | 4620 d.tex |
| WEFT | | 9's cotton |
| ENDS PER INCH | | 25 |
| PICKS PER INCH | | 2 |
| STRENGTH PER WARP END | | 64 lbs |

Considering the properties shown in Table 2 it will be seen that the monofilament/aramid hoses combines all the good properties of all the hoses known in the art with some additional properties unique to this construction:

(a) Elongation properties are as good as steel cord hoses and better than purely monofilament hoses.

(b) Minimum bend radius and crushing are the same as those properties for monofilament hoses.

(c) Specific gravity is the same as for monofilament hoses.

(d) The wall thickness for the monofilament/aramid hoses is lower than that of the purely monofilament hoses, while maintaining the same specific gravity, hence the weight is less than any existing hose.

(e) Owing to the above combination of wall thickness and specific gravity the volume (or weight) of flotation material which must be added to the hose to make it float with a reserve buoyancy of 33% is much reduced in the case of monofilament/aramid hoses in comparision with any of the existing hoses.

It will be seen that the volume of flotation material is large compared with the volume of hose body i.e., 100% to 200%, so the cost involved in both buying flotation material and applying it to the hose is considerable. However, owing to the reduced amount of buoyancy material in the present construction the susceptibility to damage and the importance of loss of buoyancy material are both reduced.

While the intermediate elastomeric layer may be a natural or synthetic rubber, the cellular foam material may be for example natural rubber, styrene butadiene rubber, polychloroprene rubber, cross linked polyethylene, cross linked ethylene vinyl-acetate copolymer, polyurethane or plasticized polyvinyl chloride, the density being in the region 0.01 to 0.75 grms/ml. The total volume and density of the cellular material is chosen to balance the higher density of the other organic components so that the overall density of the hose when full of water is in the region of 0.6 to 0.9 grms/ml.

Figure 5:
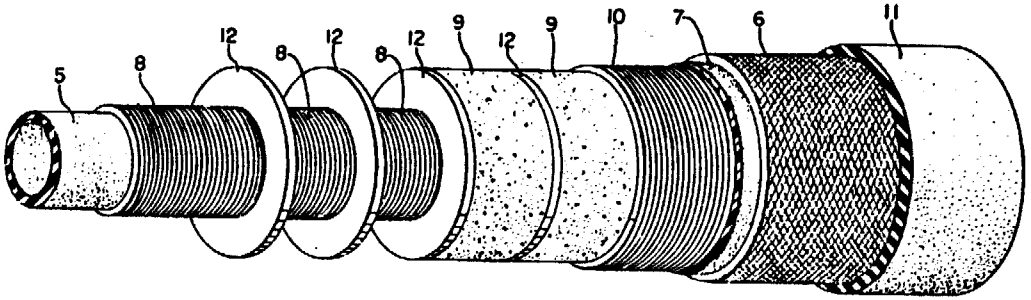
FIG. 5 is a perspective view of an embodiment wherein a flotation material is sectioned within the hose structure.

In a further embodiment of the invention the sponge or cellular material 9 may be further reinforced by annular or helical fins 12 and 14 respectively bridging between the two layers of monofilament 8 and 10 as shown in FIG. 5. The fins 12 or 14 are composed of thick, high modulus sheet material. The fins permit the construction of a stiff sandwich construction in conjunction with a very low density cellular polymeric material. The fins may in fact be composed of stiff solid polymeric material, rigid cellular polymer or of thermosetting resin with fabric reinforcement. The fins may be imagined to be built round the hose and then the intervening space filled with cellular material 9. In fact fins and cellular material may be built onto the hose together. The fins must have a high flexural modulus so that the stresses applied to the monofilament layers are transmitted between these two layers directly and not through the foam. The fins may be stiff rubber, plastic, fabric impregnated with thermosetting resin, or a rigid cellular material such as expanded (unplasticized) PVC.

Figure 6:
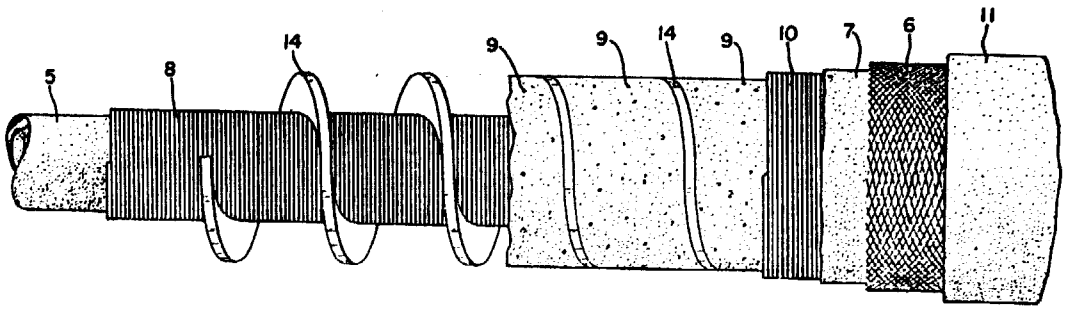
FIG. 6 is a perspective view of an embodiment wherein a flotation material is spiralled within the hose structure.

The fins 14 for helical construction shown in FIG. 6 may be a continuous extrusion of hard plastic material. The cellular material 9 would then be built between the fins of the coil.

In an alternate method knitted fabric impregnated with uncured thermosetting resin is applied to one edge of a long length of cellular material of rectangular cross-section. The cellular material is then spiralled onto the hose body over the first layer of monofilament material. Thus, the resin impregnated fabric forms a fin and during the vulcanization of the hose it becomes hard.

While certain representative embodiments and details have been shown for the purpose of illustrating the invention, it will be apparent to those skilled in this art that various changes and modifications may be made therein without departing from the spirit or scope of the invention.

[We] *I* claim:

1. A large diameter suction and discharge hose comprised of elastomeric material incorporating reinforcing elements comprising an innertube of elastomeric material, at least two radially spaced windings of monofilament lying outwardly of said innertube and wound at an angle of 50°-60° to the axis of the hose with said windings being of opposite hand orientation, a layer of elastomeric material having a thickness of at least 5% of the hose diameter between the windings of monofilament, a cover layer of elastomeric material around the outer surface of the hose, at least one layer of aramid fabric positioned in the wall of the hose between the innertube and cover layer adjacent to at least one of the windings of monofilament, and an elastomeric adhesive layer between the monofilament and aramid fabric to effect a bond between the two upon vulcanization of the integral structure.

2. A hose as claimed in claim 1 in which the layer of aramid fabric lies radially inwardly of the innermost layer of wound monofilament.

3. A hose as claimed in claim 1 in which the layer of aramid fabric is between the layers of wound monofilament.

4. A hose as claimed in claim 1 wherein each wound monofilament layer includes a plurality of windings disposed one about the other.

5. A hose as claimed in claim 2 in which at least the layer of aramid fabric comprises a plurality of said fabrics wrapped one about the other.

6. A hose as claimed in claim 5 in which adjacent aramid fabrics are of opposite hand orientation.

7. A hose as claimed in claim 1 in which the monofilament is a polyester.

8. A hose as claimed in claim 7 in which the polyester is polyethylene terephthalate.

9. A hose as claimed in claim 1 in which the monofilament is in the form of yarn with a denier in the range 1,000 to 10,000 composed of monofilaments in the range 100 to 1,500 denier.

10. A hose as claimed in claim 1 in which the aramid fabric comprises aramid yarn of 1,000 to 2,000 denier.

11. A large diameter suction and discharge buoyant hose comprised of elastomeric material incorporating reinforcing elements comprising an innertube of elastomeric material, at least two radially spaced windings of monofilament lying outwardly of said innertube and wound at an angle of 50°-60° to the axis of the hose with said windings being of opposite hand orientation, a layer of cellular polymeric foam material between the windings of monofilament and taken from the group comprising natural rubber, styrene butadiene rubber, polychloroprene rubber, cross-linked polyethylene, cross-linked ethylene vinylacetate copolymer, polyurethane or plasticized polyvinyl chloride, the density being in the range of 0.01 to 0.75 grms/ml and a thickness of at least 5% of the hose diameter, and a cover layer of elastomeric material around the outer surface of the hose, the completed hose being vulcanized into an integral structure.

12. A hose as claimed in claim 11 further comprising at least one layer of aramid fabric positioned in the wall of the hose between the innertube and cover layer adjacent to at least one of the windings of monofilament and an elastomeric adhesive layer between the monofilament and aramid fabric to effect a bond between the two upon vulcanization of the integral structure.

13. A hose as claimed in claim 11 wherein the cellular polymeric foam is reinforced by a plurality of longitudinally spaced annular fins of a high modulus sheet material bridging between the radially spaced wound monofilament.

14. A hose as claimed in claim 13 wherein the fins are comprised of a solid polymeric material.

15. A hose as claimed in claim 13 wherein the fins are comprised of a thermosetting resin material with fabric reinforcing.

16. A hose as claimed in claim 13 wherein the fins are comprised of a rigid cellular polymer.

17. A hose as claimed in claim 11 wherein the cellular polymeric foam is reinforced by a helical fin of high modulus material bridging between the radially spaced wound monofilament.

* * * * *